United States Patent Office 3,408,444
Patented Oct. 29, 1968

3,408,444
CERTAIN METAL SALT COMPLEXES USEFUL FOR CONTROLLING HELMINTHS AND IMPROVING GROWTH IN ANIMALS
Robert L. Klingbail, Midland, Mich., assignor to The Dow Chemical Company, Midland, Mich., a corporation of Delaware
No Drawing. Filed Mar. 11, 1966, Ser. No. 533,431
26 Claims. (Cl. 424—245)

ABSTRACT OF THE DISCLOSURE

Methods employing and compositions comprising a complex of a benzothiazolium compound of the formula:

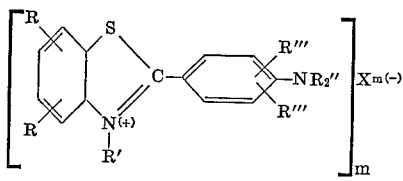

and a metal salt compound useful in controlling helminths and improving growth in animals.

This invention relates to animal husbandry and more particularly to methods and compositions adapted to be employed for improving the growth of animals, for improving the efficiency of the utilization of animal feed, for controlling parasitic organisms and for mitigating against the attack of parasitic organisms.

It is an object of the present invention to provide a new and improved practice for raising and benefiting warm-blooded animals such as mice, pigs, dogs, lambs, calves, chickens, ducks, pigeons, geese, and turkeys. A further object is to provide a new and improved method for mitigating against and protecting animals from the attack of parasitic organisms. An additional object is the provision of a method of improving the utilization of feed by animals and for improving feed efficiency. Another object is the improvement in the nutritive value of the feed ingested and utilized by animals so as to obtain a growth-furthering effect and an improved feed utilization. Another object is to provide a novel method for the control of nematode, helminth and other parasitic organisms which attack animals. It is aparticular object of the present invention to provide anovel method for controlling such parasitic organisms in the egg and larval stages; an additional particular object is to provide a novel method for preventing and/or controlling the development of that stage of a parasitic organism which is known as the "migratory," in which stage the organism migrates through the blood stream and/or lymph system of the host into a great variety of other internal organs of the host's body, such as the liver and lungs. Another object is to provide a novel method for benefiting and improving the growth. of animals. Still another object is to provide a method which can be employed prophylactically to protect animals from the attack of parasitic organisms without adversely affecting the metabolic activity, reproduction, blood formation, or other function of animals. More particularly, it is a further object to provide a method which can be employed prophylactically to protect animals from the attack of parasitic organisms in the egg and larval stages. A yet further object is to provide novel feed compositions and other novel compositions adapted to be employed in the new methods in animal husbandry. Other objects will appear throughout the following specification and appended claims.

The present invention is directed to methods employing and compositions comprising as active material a complex of (A) a benzothiazolium compound of the formula

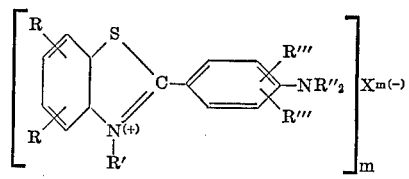

and (B) a metal salt compound. In the above and succeeding formulae, X represents a pharmaceutically acceptable anion; each R independently represents a member selected from the group consisting of hydrogen, loweralkyl, loweralkoxy, bromo, and chloro; each R' represents primary loweralkyl; R'' independently represents a member selected from the group consisting of hydrogen and primary loweralkyl; each R''' independently represents a member selected from the group consisting of hydrogen, chloro, methoxy, and methyl; and m represents an integer equal to the valence of the anion X. The term "metal salt complex" is employed in the present specification and claims to designate a product or products of the foregoing definition only.

In the present specification and claims, the unmodified term "loweralkyl" and the term "loweralkoyy" are employed to designate alkyl and alkoxy, respectively, radicals being of from 1 to 4, both inclusive, carbon atoms. The term "primary loweralkyl" designates an alkyl radical being of from 1 to 4, both inclusive, carbon atoms, and having a $CH_2$ group at the point of attachment. Thus, the term "primary loweralkyl" designates methyl, ethyl, n-propyl, n-butyl, and isobutyl. As employed in the present specification and claims, the term "halide" designates appearances of chlorine, bromine, and iodine atoms, only.

In the present specification and claims, the term "metal salt compound" is employed only to designate a compound of the formula $M_aY_b$ wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of a and b represents an integer such that (a times the valence of M) is equal to (b times the valence of Y).

Generally, the complex to be employed in accordance with the present invention exists as a 1:1 complex, that is, one molecule of benzothiazolium compound and one molecule of metal salt compound; as a 2:1 complex, that is, two molecules of benzothiazolium compound and one molecule of metal salt compound; or as a 1:2 complex, that is, two molecules of metal salt compound and one molecule of benzothiazolium compound. However, complexes having other ratios can be prepared and also give good results in the practice of the present invention. In this description, as generally throughout the present specification, the term "benzothiazolium compound" designates the entire compound described foregoing as (A) and having m units of the positive benzothiazolium radical; hence a 1:1 complex comprises more than one positive benzothiazolium radical wherever m represents an integer in excess of 1.

Each of the units which constitute the ultimate metal salt complex, that is, (A) the benzothiazolium compound unit and (B) the metal salt compound unit, comprises an anion. These anions are interchangeable. Therefore, in an alternate expression, the complex to be employed in accordance with the present invention can be described as being of the following structural formula

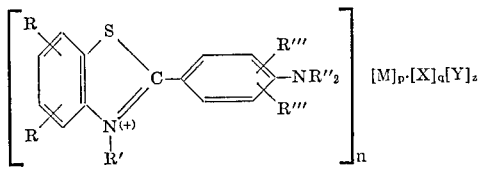

in which each of $n$, $p$, $q$, and $z$ is an integer and $[n+(p$ times the valence of $M)]$ is equal to the value of $[(q$ times the valence of $X) + (z$ times the valence of $Y)]$. In a preferred embodiment of the present invention, the anions X and Y are identical.

The primary attribute of the pharmaceutically acceptable anion (X and Y) is nontoxicity. The choice of the anion is not critical, although a given anion may in some instances exhibit special advantages, due to solubility, ease of crystallization, lack of objectionable taste and the like. Representative pharmaceutically acceptable anion moieties include the following: chloride, bromide, iodide, sulfate, bisulfate, acetate, salicylate, valerate, oleate, phenate, laurate, borate, benzoate, lactate, diglycollate phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate, cinnamate, stearate, and the like.

Hence, representative metal salt complexes to be employed in accordance with the present invention are those of a given benzothiazolium compound and each of the following metal salt compounds:

Antimony acetate, antimony trichloride, antimony tribromide, antimony triiodide, antimony sulfate, antimony tartrate, bismuth acetate, bismuth benzoate, bismuth tribromide, bismuth trichloride, bismuth citrate, bismuth triiodide, bismuth lactate, bismuth salicylate, bismuth sulfate, bismuth tartrate, cupric acetate, cuprous acetate, cupric benzoate, cuprous bromide, cupric bromide, cupric butyrate, cuprous chloride cupric chloride, cupric citrate, cupric formate, cupric glyceride, cupric lactate, cupric laurate, cupric oleate, cupric salicylate, cupric stearate, cuprous sulfate, cupric sulfate, cuprous sulfite, cupric tartrate, ferrous acetate, ferric acetate, ferric benzoate, ferrous bromide, ferric bromide, ferrous carbonate, ferous chloride, ferric chloride, ferric citrate, ferric formate, ferrous iodide, ferrous lactate, ferric lactate, ferric malate, ferric oleate, ferrous sulfate, ferric sulfate, ferrous tartrate, manganese acteate, manganese benzoate, manganese bromide, manganese chloride, manganese citrate, manganese formate, manganese iodide, manganese lactate, manganese orthophosphate, manganese metasilicate, manganese sulfate, manganese tartrate, manganese valerate, stannous acetate, stannous bromide, stannous chloride, stannous chromate, stannous iodide, stannous orthophosphate, stannous sulfate, stannous tartrate, zinc acetate, zinc aluminate, zinc benzoate, zinc borate, zinc bromide, zinc butyrate, zinc caproate, zinc carbonate, zinc chloride, zinc chromate, zinc citrate, zinc formate, zinc iodide, zinc lactate, zinc laurate, zinc oleate, zinc salicylate, zinc stearate, zinc sulfate, zinc sulfite, and zinc tartrate.

The complex to be employed in accordance with the present invention can exist as a hydrate, ordinarily as a hemihydrate, monohydrate, or dihydrate, and it is frequently convenient to prepare and separate a given product as a hydrate. Sometimes the hydrate contains a higher proportion of water per molecule of complex, such as 2 to 10 moles of water per mole of complex. Also, the products, particularly those in which either or both of X and Y represent a halogen atom, sometimes exist at least initially as a hydrohalide addition salt at the site of the para amino nitrogen. However, these hydrohalide salts readily dehydrohalogenate upon recrystallization or even merely upon standing. Because of this instability, their use is not generally preferred. However, regardless of the existence of the complex as a hydrate or hydrohalide addition salt, or of the ratio of benzothiazolium compound and metal salt compound, all of the metal salt complexes give good results in the practice of the present invention.

Most broadly, the present invention is concerned with methods and compositions useful in animal husbandry.

Thus, in one embodiment, the present invention is directed to a method which comprises administering to an animal a material which is a complex of (A) a benzothiazolium compound of the formula

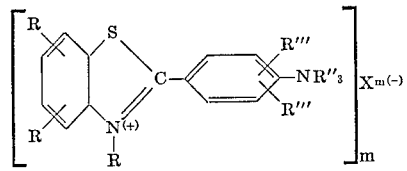

and (B) a metal salt compound.

The practice of this embodiment of the present invention, even at very low rates of administration, improves the nutritive value of animal feed so as to obtain a growth-furthering effect and improve the efficiency of the utilization of feed by animals. The practice also improves the growth made by the animals and, especially at rates of administration in excess of the very low rates, protects the animals from the attack of such parasitic organisms as Nematodirus, Ascaris, Haemonchus, Chabertia, Trichostrongylus, Strongyloides, *Necator americanus*, Moniezia, Thysanosoma, Ostertagia, Trichuris, Cooperia, Bunostomum, Oesophagostomum, Toxascaris, Hymenolepis, Aspicularis, Syphacia, Ancylostoma, Uncinaria, Taenia, Toxocara, Dipylidium and Physaloptera, in normal or abnormal hosts.

The compounds to be employed according to the present invention are crystalline solids which are somewhat soluble in organic solvents and are adapted to be administered to animals. The compounds are not repellent to animals and can be employed in admixture with grain rations or animal feeds. They can be administered continuously or intermittently in dosages sufficient to improve growth, to improve the feed efficiency, to improve the nutritive value and utilization of feed or to protect the animal from the attack of parasite organisms without in any way causing detriment to the animal or without imparting any unpalatable characteristic to animal flesh.

The administration or feeding of an effective growth-improving dosage of at least one of the compounds to be employed according to the present invention is essential and critical for the practice of this embodiment of the present invention. The amount of one or more of the compounds which will constitute an effective dosage varies considerably and is dependent upon such factors as the animal concerned, the age of the animal, the parasitic organism against which protection is sought, the life state of such organism against which protection is sought, the particular compound employed, and the like. In general, good results are obtained when there is administered to animal a dosage of from 0.01 to 1,000 milligrams of one of the compounds per kilogram of body weight and preferably from 0.01 to 500 milligrams per kilogram of body weight. Where the compound is administered on a daily schedule, good results are obtained when employing daily dosages of from 0.01 to 150 milligrams or more of one of the compounds per kilogram of animal body weight. Where parasite control is the main objective of treatment and the danger of reexposure to the attack of intestinal parasites from contaminated feed or surroundings is low, good results are obtained when there is administered to an animal a daily dosage of from 0.5 to 50 milliagrams or more per kilogram of body weight. Where such danger of reexposure is very low, good results are frequently obtained when an animal is dosed on a single occasion with from 2.5 to 1,000 milligrams of one of the compounds per kilogram of body weight. Where protection against parasite attack is of minimal importance and growth stimulation is the main objective of treatment, lower rates suffice; in this practice, good results are usually obtained when there is administered to an animal a daily dosage of from 0.01 to 5 milligrams per kilogram of body weight. A larger dosage can be employed in this practice; however, the use of such dosage does not usually result in greater stimulation, and, in view of economic considerations, is seldom desirable.

The method of this embodiment of the present invention can be carried out by administration or feeding of the unmodified compounds. However, the present invention embraces the employment of any liquid, powder, mash, drench, bolus, pellet, capsule or other animal food containing one or more of the active compounds. In such usage, the compounds can be modified with one or more of a plurality of additatments or innocuous ingestible adjuvants including water, ethanol, skim milk, edible oils, propylene glycol, syrups, grain rations, surface active dispersing agents such as the liquid and solid emulsifying agents, and edible solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. In such animal feed compositions, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

The active material can also be dispersed, with or without vitamin, mineral, or other feed supplements, upon a material, such as spaghnum moss, which serves as an edible mechanical support or roughage. The resulting treated material is employed as, or in addition to other, animal feed, or supplied to young nursing animals not yet feeding on the feed ration normally fed to the adult animals.

The exact concentration of the compounds to be employed in the compositions can vary provided that enough of the composition is ingested by the animal so as to provide the required internal amount of active ingredient. For example, where direct administration to the individual animal is preferred, liquid or solid compositions containing from 0.5 to 98 percent by weight of one or more of the agents conveniently are employed to supply the desired dosage. Representative of this type of composition is the relatively concentrated composition containing one of the active agents and nutritive supplementary materials, which composition is provided for the ad libitum consumption by animals, that is, a "salt-block" type of composition. Also representative of such compositions is a slow-release type of composition containing one of the active agents in the form of small pellets or granules which are administered orally and which lodge internally and release their contents over an extended period of time. Where one or more of the compounds is provided as a constituent of the principal food or water ration, satisfactory results are obtained with rations containing a minor but effective amount of the compounds. The exact amounts of the compounds in the ration or drinking water are dependent upon the food and water consumption and feeding and watering habits of the animal concerned. In animal feeds, the required dosage can be supplied with feeds containing at least 0.0001 percent or more and usually from 0.0001 to 0.5 percent by weight of active material. When fed as the principal food ration, the required dosage is conveniently supplied with feeds containing from 0.0001 to 0.3 percent by weight of active material. Where parasite control is the main objective of treatment, feeds containing from 0.001 to 0.3 percent by weight of active material give good results. Where growth stimulation with or without parasite control is the main objective, feeds containing a lower concentration of active material, such as from 0.0001 to 0.01 percent, are adequate and give good results. Where the compounds are furnished in the drinking water, good results are obtained at concentrations of the agents in the water equal to one-half those employed when the compounds are supplied as a constituent in the principal food ration. In compositions to be employed as concentrates, the active agents can be present in a concentration of from 0.5 to 98 or 5 to 98 percent by weight. Preferred concentrate compositions oftentimes contain two or more percent by weight of a liquid or solid surface active agent.

Liquid feed compositions containing the desired amount of the compounds can be prepared by dissolving the compounds in ethanol, propylene glycol or an edible oil or by dispersing them in water with or without the aid of a suitable surface active dispersing agent such as an ionic or nonionic surface active agent. Suitable surface active dispersing agents include the glycerol and sorbitan esters of fatty acids and the polyoxyalkylene derivatives of fatty alcohols and of sorbitan esters. The aqueous compositions can contain one or more water-immiscible oils as a solvent for the active agent. In such compositions, the water, oil and emulsifying agent constitute an aqueous emulsion adjuvant or helper.

In the preparation of solid feed compositions, the compounds can be mechanically ground with an edible solid such as cereal meal, ground yellow corn, ground oats, finely ground meat and bone scraps, or a solid surface active dispersing agent such as finely divided bentonite or fuller's earth. These compositions can be administered in the form of capsules or tablets or dispersed in an animal feed and such feed used to supply a part or all of the ration. Alternatively, the compounds can be dissolved in an organic solvent such as alcohol or acetone and the resulting mixture dispersed in an animal feed which is then dried to remove the solvent. The compounds can also be dispersed in an edible oil such as coconut, olive, linseed, soybean, cottonseed or peanut oil, or animal fats and tallows, and the resulting mixtures dispersed in the feed. These edible oil compositions can contain one of the aforementioned emulsifying materials as a dispersing agent.

Where the parasite control of the foregoing embodiment is the prime object, such control can be achieved in another embodiment. In this embodiment, the present invention is directed to a method for the control of a parasitic organism which is a parasite of a host animal body, which comprises contacting the parasitic organism in its infective phase outside the host animal body with a parasiticidal amount of an active material selected from the group consisting of a complex of (A) a benzothiazolium compound of the formula

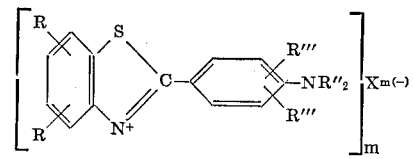

and (B) a metal salt compound.

Thus, the same active material is employed in, and the same kinds of parasites are controlled by, both embodiments, the present embodiment wherein the infective phase of the parasite is contacted outside of the host animal body, as well as the previous embodiment wherein the parasite is contacted inside the host animal body by administration of the active material to the host. However, the previous embodiment has growth-enhancing effects independent from its parasiticidal effects and for this reason, the previous embodiment is generally preferred.

While the terms "infective stage" and "infective phase" are equivalent as to meaning and are well known and understood in the field of parasitology, the particular developmental stage of the parasitic organism which is the infective stage or phase varies with the identity of the specific parasitic organism. Most commonly, the infective phase is the egg of the organism; in other instances, such as in some of the ascarids, that is, those parasitic organisms which are of the family Ascaridae, the infective phase is an egg which, following its passage from a prior host animal body, develops into a form known as an embryonated egg. In still other instances, the infective phase is a larval form. However, the method of this embodiment is effective regardless of the developmental stage which is the infective phase of a given parasitic organism.

The contacting of a parasite in its infective phase outside the host animal body with a parasiticidal amount of the active material is essential and critical to the practice of this embodiment of the present invention. This embodiment can be carried out by application of the unmodified products. However, it is more conveniently carried out by employing the active material in a composition, which may be a liquid, dust, or granular solid composition.

In liquid, dust, or granular composition, the active material is modified with one or a plurality of additaments or adjuvants for parasiticidal compositions such as water or other liquid carriers, surface-active dispersing agents and finely divided solids. Depending upon the concentration of active compound, such augmented compositions are adapted to be applied to parasites in their infective phase or to be employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods wherein the agent is dispersed in a solvent and the resultant dispersion mixed with a propellant in liquid state. Such variables as the particular compound to be used and the particular substrate to be treated will determine the identity of the solvent and the concentration of the active compound.

The exact concentration of the active material to be employed in the treating compositions is not critical and may vary considerably provided the required dosage of active material is supplied upon the parasitic organism or its habitat. The concentration of the active material in liquid compositions employed to supply the desired dosage generally is from about 0.0001 to 50 percent by weight. Concentrations of up to 95 percent by weight are oftentimes conveniently employed. In dusts, the concentration of active component can be from about 0.01 to 20 percent by weight. In compositions to be employed as concentrates, the active material can be present in a concentration of from about 5 to 98 percent by weight.

The quantity of the composition applied is not critical provided only that the required dosage of active material is applied in sufficient of the finished composition to cover adequately the habitat of parasitic organisms to be controlled.

Liquid compositions containing the desired amount of active component can be obtained by dissolving the compound in an organic liquid carrier or by dispersing the active agent in water. With the water-insoluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvents, emulsifying agent and the amount thereof employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex alcohols, mahogany soaps and the like.

In the preparation of dust compositions, the active component is dispersed in and on a finely divided solid which is non-reactive with the active material such as talc, chalk, gypsum and the like. In such operations, the finely divided carrier is mixed with the active material or a volatile organic solvent solution thereof. Similarly, dust compositions containing the active material are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk or gypsum and the like to obtain the desired amount of active material in compositions adapted to be employed for the control of parasitic organisms outside of the host animal body. Also, such concentrated dust compositions can be dispersed in water with or without the aid of a dispersing agent, to form spray mixtures.

When operating in accordance with this embodiment of the present invention, the active material or preferably a composition comprising the active material is applied to interior walls and floors of barns, animal pens, and the like in any convenient fashion, for example, with power sprayers and dusters and boom and hand sprayers.

The following examples illustrate the invention but are not to be construed as limiting.

EXAMPLE 1

2 - (p - dimethylaminophenyl) - 3,6 - dimethylbenzothiazolium chloride 2:1 complex with cadmium chloride monohydrate was dispersed in mouse feed to prepare a modified feed composition containing about 0.12 percent of the subject compound. This feed composition and unmodified mouse feed were fed as sole feed rations to groups of mice having a heavy infestation of pinworms (Aspicularis tetraptera). About seven days following initiation of the diets, the mice were sacrificed. An examination of each mouse was made and the treated mice compared with the untreated check mice as regards the number of worms to be found in their gastro-intestinal tracts. As a result of the examination, there was found a complete kill and control of pinworms in the treated mice with a continued heavy infestation in the untreated check mice.

EXAMPLE 2

Other representative metal salt complexes were evaluated, each separately, in the procedures of Example 1, for the control of pinworms. These compounds were as follows:

2-(p-dimethylaminophenyl)-3,6-dimethylbenzothiazolium chloride 2:1 complex with zinc chloride monohydrate;
2-(p-dimethylaminophenyl)-3,6-dimethylbenzothiazolium bromide 1:1 complex with zinc bromide monohydrate;
2-(p-dimethylaminophenyl)-3,6-dimethylbenzothiazolium chloride 1:1 complex with cupric chloride hemihydrate;
2-(p-dimethylaminophenyl)-3,6-dimethylbenzothiazolium chloride 1:1 complex with ferric chloride; and
2-(p-dimethylaminophenyl)-3,6-dimethylbenzothiazolium chloride 1:1 complex with antimony chloride.

In the evaluation of each of these compounds, there was found a complete kill and control of pinworms in the treated mice and a continuing heavy infestation of pinworms in the untreated check group.

EXAMPLE 3

2 - (p - dimethylaminophenyl) - 3,6 - dimethylbenzothiazolium chloride 1:1 complex with zinc chloride monohydrate was incorporated in a complete mouse feed to prepare a feed composition containing 0.12 percent of the subject compound. This feed composition and unmodified feed were fed as sole rations to groups of mice which were heavily infested with Hymenolepis spp.

About seven days following the initiation of the diets, the mice were sacrificed and autopsied. An examination of each mouse was made and the treated mice compared with the untreated check mice as regards the number of worms to be found in their gastro-intestinal tracts. As a result of the examination, there was found a complete control of Hymenolepis spp. in the treated mice with a continued heavy infestation in the untreated group.

EXAMPLE 4

Results essentially the same as those obtained in the evaluation reported in Example 3 were obtained when repeating the evaluation employing as subject compound, separately, each of the following metal salt complexes:

2-(p-dimethylaminophenyl)-3,6-dimethylbenzothiazolium chloride 2:1 complex with zinc chloride monohydrate; and 2-(p-dimethylaminophenyl)-3,6-dimethylbenzothiazolium bromide 1:1 complex with cuprous bromide.

EXAMPLE 5

The monohydrate of 2-(p-dimethylaminophenyl)-3,6-dimethylbenzothiazolium chloride 2:1 complex with zinc chloride was employed for the control of parasitic organisms in groups of sheep known to be heavily infested and voiding an average of 3640 ova per gram of feces, including ova of Haemonchus, Trichuris, Trichostrongylus, Cooperia, Bunostomum, Oesophagostomum, and Ostertagia. Specifically, all of the animals of one group were dosed, by means of a gelatin capsule, with 200 milligrams of the subject compound per kilogram of individual sheep weight. Another group of sheep was left untreated to serve as a check. About six days following the administration of the subject compound to the treated group, the feces of all of the sheep were examined and counts to determine the percent reduction in fecal ova and control of parasitic organisms. It was found that in the treated group, there was obtained a 94 percent reduction of fecal ova and control of the named parasitic organisms while in the check group, there was a continuing heavy infection of the named parasitic organisms.

EXAMPLE 6

Various of the compounds to be employed according to the present invention were evaluated for the control of Ascaris lumbricoides var. suum in the larval state and for the prevention and/or control of the migration of such Ascaris larvae. In these evaluations, each of the subject compounds were separately dispersed in a commercial swine feed to produce an animal feed composition containing the subject compound. A number of swine, all of the same history and past environment and all of an age of about 5 to 6 weeks, were divided into groups. Feeding of the swine was begun, various groups (the treated groups) being respectively fed the modified animal feed compositions containing the various subject compounds, another group (the control group) being fed the unmodified commercial swine feed. Simultaneously with the initiation of the feeding and 17 days thereafter, all of the swine were weighed and the average weight for each group determined. Seventy-two hours after initiation of the feeding, each animal was inoculated with 25,000 embryonated ova of Ascaris lumbricoides var. suum; a second inoculation of each animal with 25,000 embryonated ova of Ascaris lumbricoides var. suum was made ninety-six hours following initiation of the feeding. Thereafter, the swine were observed for the remainder of the 17-day period following initiation of the feeding for symptoms of the attack of migrating larvae of Ascaris lumbricoides var. suum. About 7 days after first inoculation thereof with the Ascaris larvae, the swine of the control group exhibited symptoms of the attack of Ascaris larvae, namely, elevated temperatures, respiratory difficulties such as coughing and labored breathing, and disturbances of growth, such as anorexia, all such symptoms being attributable to the presence of the migrating larvae of Ascaris lumbricoides var. suum in the respiratory system. In the treated group, no symptoms of the attack of migratory Ascaris larvae were observed at any time, and the swine were judged to be in all respects normal and healthy.

The various subject compounds, the respective concentrations thereof in the feed compositions, the average weight per animal for each of the groups, the average weight gained per animal for each of the groups, and the feed efficiency for each of the groups, are set forth in the following table. The feed efficiency is the number of pounds of feed eaten per pound of body weight gained.

| Subject Compound | Percent Concentration of Subject Compound in Diet | Average Weight Per Animal in Pounds | | Average Weight Gained per Animals in Pounds | Feed Efficiency per Group |
|---|---|---|---|---|---|
| | | Upon Initiation of Feeding | 17 Days Following Initiation of Feeding | | |
| 2-(p-dimethylaminophenyl)-3,6-dimethylbenzothiazolium chloride 1:1 complex with ferrous chloride dihydrate | .006 | 23.0 | 44.3 | 21.3 | 2.22 |
| 2-(p-dimethylaminophenyl)-3,6-dimethylbenzothiazolium chloride 2:1 complex with zinc chloride monohydrate | .009 | 23.7 | 43.2 | 19.5 | 2.39 |
| Control | | 36.0 | 54.8 | 18 | 2.78 |

EXAMPLE 7

2 - (p - dimethylaminophenyl) - 3,6 - dimethylbenzothiazolium chloride 2:1 complex with ferrous chloride dihydrate was evaluated in the procedures of Example 6 at a rate of 0.012 percent of the animal feed composition.

About 7 days after the first inoculation thereof with the Ascaris larvae, the swine of the control group exhibited symptoms of the attack of Ascaris larvae, namely, elevated temperatures, respiratory difficulties such as coughing and labored breathing, and disturbances of growth, such as anorexia, all such symptoms being attributable to the presence of the migrating larvae of Ascaris lumbricoides var. suum in the respiratory system. In the treated group, no symptoms of the attack of migratory Ascaris larvae were observed at any time, and the swine were judged to be in all respects normal and healthy.

The average weight per animal for each of the groups, the average weight gained per animal for each of the groups, and the feed efficiency for each of the groups are set forth in the following table.

| | Average weight per animal in pounds | | Average weight gained per animal in pounds | Feed efficiency per group |
|---|---|---|---|---|
| | Upon initiation of feeding | 17 days following initiation of feeding | | |
| Treated group | 24.5 | 40.0 | 15.5 | 2.00 |
| Control group | 23.5 | 30.0 | 6.5 | 3.00 |

EXAMPLE 8

2-(p-dimethylaminophenyl) - 3,6 - dimethylbenzothiazolium chloride 1:1 complex with zinc chloride monohydrate was evaluated, according to the procedures employed in Example 6, for the control of the larval stage of *Ascaris lumbricoides* var. *suum* in swine. In these operations, the subject compound was incorporated in modified animal feed compositions in various amounts, representing in one such composition, 0.025 percent of subject compound by weight of ultimate modified feed composition; in a second, 0.012 percent; in a third, 0.009 percent; and in a fourth, 0.006 percent. Each of the modified animal feed compositions was employed in a separate evaluation according to the procedures of Example 6. About 7 days after the first inoculation thereof with the Ascaris larvae, the swine of the control group exhibited symptoms of the attack of Ascaris larvae, namely, elevated temperatures, respiratory difficulties such as coughing and labored breathing, and disturbances of growth, such as anorexia, all such symptoms being attributable to the presence of the migrating larvae of *Ascaris lumbricoides* var. *suum* in the respiratory system. In each of the treated groups, the swine were essentially free of symptoms of the attack of migratory Ascaris larvae, and were judged to be in all respects normal and healthy.

The average weight per animal for each of the groups, the average weight gained per animal for each of the groups, and the feed efficiency for each group are set forth in the following table.

|  | Average Weight Per Animal in Pounds | | Average Weight Gained per Animal in Pounds | Feed Efficiency per Group |
|---|---|---|---|---|
|  | Upon Initiation of Feeding | 17 Days Following Initiation of Feeding | | |
| Treated group feeding on animal feed containing 0.025 percent by weight of subject compound | 28.5 | 47.0 | 18.5 | 2.42 |
| Treated group feeding on animal feed containing 0.012 percent by weight of subject compound | 27.5 | 37.0 | 10.5 | 3.81 |
| Treated group feeding on animal feed containing 0.009 percent by weight of subject compound | 26.0 | 40.0 | 14.0 | 3.48 |
| Treated group feeding on animal feed containing 0.006 percent by weight of subject compound | 26.0 | 42.0 | 16.0 | 2.58 |
| Control Group | 26.0 | 44.0 | 8.0 | 6.66 |

EXAMPLE 9

Ninety parts by weight of 2-(p-dimethylaminophenyl)-3,6-dimethylbenzothiazolium chloride 1:1 complex with zinc chloride monohydrate are mechanically ground with bentonite to produce a concentrate composition containing 90 percent by weight of the subject compound.

In identical procedures, concentrate compositions containing 90 percent by weight of one of the compounds to be employed according to the present invention are prepared from 2-(p-dimethylaminophenyl)-3,6-dimethylbenzothiazolium chloride 1:1 complex with cupric chloride;
2-(p-dimethylaminophenyl)-3,6-dimethylbenzothiazolium bromide 2:1 complex with cupric bromide;
2-(p-dimethylaminophenyl)-6-chloro-3-methylbenzothiazolium iodide 1:1 complex with cuprous iodide;
2-(p-dimethylaminophenyl)-3,6-dimethylbenzothiazolium chloride 2:1 complex with ferrous chloride dihydrate;
2-(p-dimethylaminophenyl)-3-methylbenzothiazolium iodide 1:1 complex with bismuth iodide;
2-(p-dimethylaminophenyl)-3,6-dimethylbenzothiazolium chloride 1:1 complex with bismuth chloride;
2-(4-diethylamino-3-chlorophenyl)-3-methylbenzothiazolium salicylate 1:1 complex with bismuth salicylate;
2-(p-dimethylaminophenyl)-3,6-dimethylbenzothiazolium chloride 1:1 complex with antimony trichloride;
2-(4-dimethylamino-m-tolyl)-3-methylbenzothiazolium valerate 1:1 complex with manganese valerate;
2-(p-dimethylaminophenyl)-3,6-dimethylbenzothiazolium bromide 1:1 complex with cuprous bromide; and
2-(p-dimethylaminophenyl)-3,5,6-trimethylbenzothiazolium oleate 1:1 complex with ferric oleate.

EXAMPLE 10

In other procedures, feed supplements are prepared by grinding together 50 parts by weight of one of the compounds to be employed according to the present invention with one part of sorbitan monopalmitate (Span 20) and 49 parts of attapulgite clay to produce compositions containing 50 percent by weight of one of the subject compounds. In these procedures, feed supplements are prepared with the compounds identified in Example 9 and with 2-(p-dimethylaminophenyl)-3,6-dimethylbenzothiazolium chloride 2:1 complex with cadmium chloride monohydrate;
2-(p-dimethylaminophenyl)-3,6-dimethylbenzothiazolium chloride 1:1 complex with ferric chloride;
2-(p-dimethylaminophenyl)-3-ethylbenzothiazolium benzoate 1:2 complex with cupric benzoate;
2-(p-dimethylaminophenyl)-3-methylbenzothiazolium chloride 1:1 complex with zinc chloride monohydrate;
2-(2,5-dichloro-4-diethylaminophenyl)-3,5,6-trimethylbenzothiazolium lactate 1:1 complex with manganese lactate;
2-(p-dimethylaminophenyl)-3,6-dimethylbenzothiazolium chloride 2:1 complex with manganese chloride monohydrate;
2-(4-di-n-propylamino-6-chloro-m-tolyl)-3,6-diethylbenzothiazolium chloride 1:1 complex with zinc chloride;
2-(p-dimethylaminophenyl)-3,6-dimethylbenzothiazolium chloride 2:1 complex with zinc chloride monohydrate;
2-(4-di-n-butylamino-3-methoxyphenyl)-6-n-butyl-4-chloro-3-n-propylbenzothiazolium formate 1:1 complex with cupric formate;
2-(p-dimethylaminophenyl)-3,6-dimethylbenzothiazolium bromide 1:1 complex with zinc sulfate;
2-(p-dimethylaminophenyl)-6-isopropyl-4-methoxy-3-n-butylbenzothiazolium carbonate 1:1 complex with ferric carbonate; and
2-(p-dimethylaminophenyl)-3,6-dimethylbenzothiazolium bromide 1:1 complex with ferrous bromide hydrobromide.

EXAMPLE 11

In other operations, 20 parts by weight of one of the compounds to be employed according to the present invention are mechanically mixed with 80 parts of soy bean meal to produce animal feed compositions containing 20 percent of one of the compounds. In this operation, such animal feed compositions are prepared with the compounds identified in Examples 9 and 10 and with 2-(4-ethylamino-3,5-xylyl)-5,6-diethoxy-3-isobutylbenzothiazolium chloride 1:1 complex with cuprous chloride;
2-(p-dimethylaminophenyl)-3,6-dimethylbenzothiazolium sulfate 1:1 complex with ferrous sulfate monohydrate;
2-(p-diisobutylaminophenyl)-6-n-butoxy-3-methylbenzothiazolium chloride 1:1 complex with zinc butyrate;
2-(p-dimethylaminophenyl)-3,6-dimethylbenzothiazolium bromide 1:1 complex with zinc bromide monohydrate;

2-(4-amino-2,5-dimethoxyphenyl)-5,6-dibromo-3-methylbenzothiazolium bromide 1:1 complex with stannous bromide;

2-(p-dimethylaminophenyl)-3,6-dimethylbenzothiazolium phosphate 1:1 complex with stannous phosphate;

2-(p-dimethylaminophenyl)-3,6-dimethylbenzothiazolium chloride 1:1 complex with cuprous chloride hydrochloride;

2-(4-dimethylamino-m-tolyl)-6-chloro-3,4-dimethylbenzothiazolium formate 1:1 complex with manganese formate;

2-(p-dimethylaminophenyl)-3,6-dimethylbenzothiazolium acetate 1:1 complex with zinc acetate;

2-(p-diethylaminophenyl)-4,7-dichloro-3-ethylbenzothiazolium iodide 1:1 complex with bismuth iodide;

2-(p-dimethylaminophenyl)-3,6-dimethylbenzothiazolium chloride 1:1 complex with zinc chloride hemihydrate;

2-(p-ethylmethylaminophenyl)-3,6-dimethylbenzothiazolium acetate 1:1 complex with ferrous acetate; and 2-(p-dimethylaminophenyl)-3,6-dimethylbenzothiazolium chloride 1:1 complex with stannous chloride.

EXAMPLE 12

In an additional operation, one of the subject compounds to be employed according to the present invention is dispersed in 90 parts of cottonseed oil to prepare an edible oil composition containing the compound. Such compositions are prepared with each of the subject compounds of Examples 9, 10, and 11.

These compositions are adapted to be administered to animals to supply the desired dosage of active compound or to be employed as concentrates and subsequently diluted with additional edible adjuvants, grain rations, or animal feeds, to produce animal feed compositions containing the desired amount of active agents.

EXAMPLE 13

Each of the subject compounds as identified in Examples 9, 10, and 11 is employed to prepare an animal feed composition containing 0.015 percent by weight of one of the subject compounds. In these procedures, the particular subject compound is dispersed in a commercial swine feed to produce the feed composition. These compositions are of outstanding nutritive value and are adapted to be fed to animals to obtain a growth-furthering effect and superior feed efficiency. The compositions are also useful in animal husbandry to control parasitic organisms. In particular, such compositions are useful to control the larvae of parasitic organisms and to prevent and/or control the attack of migrating larvae of parasitic organisms, such as *Ascaris lumbricoides* var. *suum*.

EXAMPLE 14

In a further embodiment, the compounds to be employed in accordance with the present invention, or compositions containing the same, advantageously can be employed in the present methods and compositions in combination with one or more other feed additives, including agents active against parasitic organisms, antibiotic materials, hormone and hormone-like materials and agents to improve feed efficiency. Such feed additives can be included either as adjuvants or as supplemental materials.

Representative feed additives and agents include chlortetracycline, oxytetracycline, penicillin, bacitracin and bacitracin salts, streptomycin, tylosin, hygromycin, erythromycin, oleandomycin, 4-aminophenylarsonic acid, sodium arsanilate, 3-nitro-4-hydroxyphenylarsonic acid, oil of chenopodium, sodium fluoride, cadmium oxide, cadmium anthranilate, and piperazine and substituted piperazine compounds.

In representative operations, each of the food additives identified in the preceding paragraph together with one of the compounds shown in Examples 9, 10, and 11 is mechanically mixed and ground with commercial swine feed to produce animal feed compositions. In such operations, the materials are employed in amounts sufficient to provide food compositions containing 0.00125 percent by weight of one of the feed additives identified in the preceding paragraph and 0.006 percent by weight of one of the compounds shown in the specified earlier examples. These compositions are of excellent value in animal husbandry and are adapted to be fed to swine to obtain a growth-furthering effect and superior feed efficiency and to mitigate against the attack of parasitic organisms and particularly the attack of larvae of parasitic organisms such as *Ascaris lumbricoides* var. *suum*.

EXAMPLE 15

2-(p-dimethylaminophenyl)-3,6-dimethylbenzothiazolium chloride 2:1 complex with zinc chloride monohydrate was dispersed in a commercial swine feed to produce an animal feed composition containing 0.018 percent of the subject compound by weight of the ultimate animal feed composition. This composition was evaluated for the control of *Ascaris lumbricoides* var. *suum*. In the evaluations, two groups of swine were employed; all of the swine were of the same history and past environment and were 5 to 6 weeks old. Feeding of the swine was begun, one group (the treated group) being fed the modified animal feed composition containing the subject compound, the other group (the control group) being fed the unmodified commercial swine feed. The swine were maintained under field conditions for about the first 45 days of the evaluation, and under standard indoor conditions afterwards until the test ended after a total of 114 days. Under both circumstances, the swine were continually subject to infection from natural sources.

At essentially weekly intervals beginning at day 3, all swine were weighed to determine the average weight gained up to that time for each group; in addition, the feed efficiency was computed on the basis of the weight gained and food consumed up to that time.

At the end of 24 days, again at the end of 38 days, and again at the end of 52 days, one swine from each group was sacrificed, the gut examined for the presence of Ascaris larvae, and the liver examined for scars resulting from the attack of migrating Ascaris larvae.

In addition, beginning at 52 days after initiation of the test, a fecal sample was collected from each swine and examined microscopically to determine the number of Ascaris organisms present per gram of fecal matter. The resulting numbers were averaged for each group.

The results of the evaluation are set forth in the following tables.

AVERAGE WEIGHT GAINED PER ANIMAL IN POUNDS

| Days | 10 | 17 | 24 | 31 | 38 | 45 | 52 | 59 | 66 | 73 | 80 | 87 | 94 | 100 | 107 | 114 |
|---|---|---|---|---|---|---|---|---|---|---|---|---|---|---|---|---|
| Treated group | 8.9 | 13.7 | 22.0 | 31.6 | 42.9 | 59.1 | 73.0 | 90.2 | 105.4 | 123.6 | 136.5 | 148.1 | 161.5 | 175.0 | 187.2 | 198.8 |
| Control group | 7.7 | 15.1 | 23.3 | 29.0 | 41.9 | 49.1 | 64.4 | 79.1 | 92.9 | 110.1 | 118.2 | 132.4 | 142.6 | 154.6 | 168.0 | 180.8 |

FEED EFFICIENCY PER GROUP

| Days | 10 | 17 | 24 | 31 | 38 | 45 | 52 | 59 | 66 | 73 | 80 | 87 | 94 | 100 | 107 | 114 |
|---|---|---|---|---|---|---|---|---|---|---|---|---|---|---|---|---|
| Treated group | 2.24 | 2.73 | 2.59 | 2.62 | 2.61 | 2.52 | 2.59 | 2.65 | 2.78 | 2.85 | 3.01 | 3.17 | 3.27 | 3.34 | 3.29 | 3.51 |
| Control group | 2.44 | 2.60 | 2.51 | 2.75 | 2.95 | 2.94 | 2.83 | 2.89 | 2.98 | 3.00 | 3.30 | 3.36 | 3.50 | 3.58 | 3.59 | 3.66 |

SACRIFICED ANIMALS

|  | Larvae in Gut | Scars on Liver |
|---|---|---|
| Treated Group: | | |
| 1 | 0 | 50–60 |
| 2 | 0 | 10–15 |
| 3 | 0 | 10–15 |
| Control Group: | | |
| 1 | 104 | 200–300 |
| 2 | 400+ | 200–300 |
| 3 | 105 | 200–300 |

AVERAGE NUMBER OF EGGS PER GRAM OF FECES

| Days | 52 | 59 | 66 | 73 | 80 | 87 | 94 | 100 | 107 | 114 |
|---|---|---|---|---|---|---|---|---|---|---|
| Control Group | 363 | 380 | 874 | 814 | 423 | 574 | 562 | 734 | 682 | 440 |
| Treated Group | 0 | 0 | 0 | 0 | 0 | 0 | 0 | 0 | 0 | 0 |

EXAMPLE 16

2 - (p - dimethylaminophenyl) - 3,6 - dimethylbenzothiazolium chloride 1:1 complex with cupric chloride hemihydrate was evaluated for growth stimulation effects in chicks. In this evaluation, the subject compound was incorporated in a chicken feed, of standard composition except that no antibiotic was included therein, to obtain a modified feed containing 10 grams of the compound per ton of ultimate modified feed (corresponding to 0.0011 percent of the compound in the modified feed). one-day old chicks, each weighing 45 grams, were employed; the chicks were divided into two groups. In the evaluation, one group, consisting of four replications of three chicks each, was fed the modified feed and the other group, also consisting of four replications of three chicks each, was fed unmodified feed to serve as a control. Both groups were maintained under the same conditions for a period of two weeks. At the end of the two weeks, the chicks were again weighed and the amount of gain for each chick determined. Thereafter, an average gain per chick was calculated for each of the groups. The results were as follows:

| | Average gain per bird in grams |
|---|---|
| Group on modified feed | 178.8 |
| Control group | 153.4 |

Hence, the group on modified feed exhibited a weight gain 16.5 percent greater than the weight gain exhibited by the control group.

EXAMPLE 17

2 - (p - dimethylaminophenyl) - 3,6 - dimethylbenzothiazolium chloride 1:1 complex with zinc chloride dihydrate and 2-(p-dimethylaminophenyl)-3,6-dimethylbenzothiazolium chloride 2:1 complex with ferrous chloride dihydrate were evaluated for growth stimulation. The evaluation was carried out in accordance with the procedures of Example 16 except that the modified feeds contained the respective subject compound in the amount of 50 grams of compound per ton of ultimate modified feed (0.0055 percent). The results were as follows:

| | Average gain per bird in grams |
|---|---|
| Group on feed modified by incorporation of 2-(p-dimethylaminophenyl) - 3,6 - dimethylbenzothiazolium chloride 1:1 complex with zinc chloride dihydrate | 168.1 |
| Group on feed modified by incorporation of 2-(p-methylaminophenyl) - 3,6 - dimethylbenzothiazolium chloride 2:1 complex with ferrous chloride dihydrate | 171.7 |
| Control group | 148.6 |

Hence, the treated groups exhibited weight gains 13.1 and 15.5 percent, respectively, greater than the weight gain exhibited by the control group.

EXAMPLE 18

2 - (p - dimethylaminophenyl) - 3,6 - dimethylbenzothiazolium chloride 1:1 complex with cupric chloride hemihydrate was further evaluated for growth stimulation of chickens. The evaluation was carried out in accordance with the procedures of Example 16 except that the modified feed contained the subject compound in the amount of 1 gram per ton (corresponding to 0.00011 percent of the compound in the feed). The results were as follows:

| | Average gain per bird in grams |
|---|---|
| Group on modified feed | 190.55 |
| Control group | 174.33 | corresponding to a 9.3 percent greater weight gain in the treated group than in the control group.

The compounds to be employed according to the present invention are prepared by reacting the corresponding uncomplexed compounds, of the formula

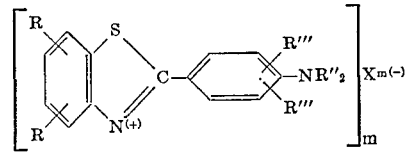

with a metal salt compound, as previously defined. The reaction is conveniently carried out in an inert liquid reaction medium, preferably water or a loweralkanol, and at temperatures of from 20° C. to the boiling temperature of the reaction medium employed. The desired compound is obtained in good yield when employing the reactants in amounts which represent stoichiometric proportions or an excess of the metal salt compound. The reaction goes forward readily and the desired product is separated in conventional procedures, typically by filtration.

The corresponding uncomplexed material is itself prepared in known procedures. In one such procedure, an aminobenzenethiol compound of the formula

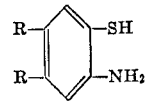

is reacted at temperatures of about 150° C. with an aminobenzene compound of the formula

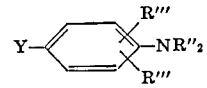

In the aminobenzene compound, Y can be any of numerous acidic functional groups, such as carboxy (—COOH), carbonyl chloride

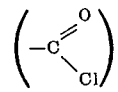

formyl

cyano (—CN), and the like; generally, an aminobenzene reactant wherein Y represents formyl is employed. The reaction goes forward in the presence or absence of an inert liquid reaction medium to prepare a benzothiazole compound of the formula

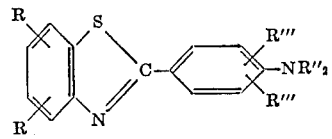

This benzothiazole compound is separated by sublimation, solvent extraction, or recrystallization.

Thereafter, in those starting materials wherin each R″ symbol represents primary loweralkyl, the separated benzothiazole compound is quaternized by reaction with an appropriate quaternizing agent, such as a primary loweralkyl halide, diprimary loweralkyl sulfate, or primary loweralkyl ester of p-toluene sulfonate acid. In many instances, the quaternizing agent, particularly the primary loweralkyl halide, is conveniently prepared in situ. For example, the quaternizing agent methyl chloride can be prepared in situ by employing methanol and hydrochloric acid. In the quaternization reaction, it is preferable to employ one equimolecular quantity of benzothiazole compound and one or more equimolecular quantities of quaternizing agent. Good results are obtained when the quaternization is conducted at temperatures of from about 100° C. to about 160° C. Preferably, the quaternization is conducted in an inert liquid reaction medium; in many instances, an excess amount of one of the quaternizing agents or one of the reagents employed to prepare the quaternizing agent in situ is employed as inert liquid reaction medium. As a result of such quaternization procedures, there is prepared the uncomplexed benzothiazolium compound of the present invention wherein X represents halide, —R′SO$_4$, or

This benzothiazolium compound is separated from the reaction mixture in any of the conventional separation techniques. For example, the benzothiazolium compound sometimes precipitates and is separated by filtration. In other instances, the reaction mixture containing the benzothiazolium compound as a product becomes a solid mass during the course of the reaction, and the reaction product is taken up in, and recrystallized from, a solvent, such as acetone, an alcohol, which can be methanol, ethanol, or isopropanol, or a mixture of such alcohol with another solvent, such as ether or benzene. In yet other instances, the benzothiazolium compound is extracted from the reaction mixture with water, a "salting out agent" added to the resulting aqueous extract to precipitate the product, and the precipitated product separated by filtration. In such procedures, the salting out agent can be any salt having as an anion the desired X moiety. Commonly, sodium or potassium salts are employed as salting out agents. Thus, in this procedure are prepared and separated all products of the benzothiazolium compound to be employed according to the present invention. These compounds are purified, if desired, by conventional procedures, such as recrystallization from solvent.

In another procedure for the preparation of those starting materials wherein each R″ symbol represents primary loweralkyl, a nitrobenzene compound of the formula

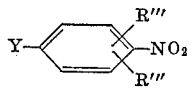

wherein the symbol Y has the same meaning as above defined, is reacted with the aminobenzenethiol compound as previously defined to prepare an intermediate compound of the formula

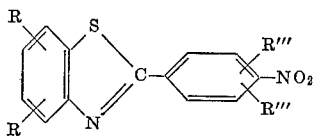

The nitro moiety of this intermediate compound is thereafter reduced, in any of various procedures, such as reaction of the compound with iron and hydrochloric acid, to prepare a product of the formula

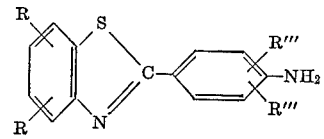

This product is thereafter reacted with an appropriate primary loweralkylating agent, or with two different primary loweralkylating agents simultaneously or successively, to prepare the benzothiazole compound as above defined, which is quaternized and separated in the manner hereinabove discussed to prepare all products of the benzothiazolium compound to be employed according to the present invention. This procedure is most conveniently employed for only those products wherein both primary loweralkyl groups on the ar-amino nitrogen atom are the same.

Those starting materials wherein at least one R″ symbol represents hydrogen are prepared by a modification of the foregoing procedures. Material of the following formula

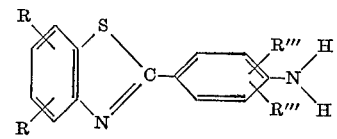

is prepared as taught hereinabove. This material can be reacted with a primary loweralkylating agent as previously described to obtain the corresponding material wherein one of the amino hydrogen atoms is replaced by primary loweralkyl:

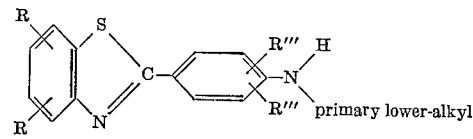

Either material is then reacted with acetic anhydride to obtain a compound in which the amino nitrogen is hindered;

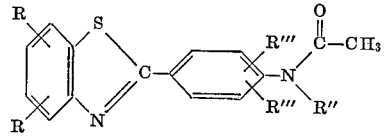

The ring nitrogen of this compound is then quaternized, as discussed foregoing, and the resulting quaternized material reacted with hydrochloric acid to obtain the desired starting material as a chloride

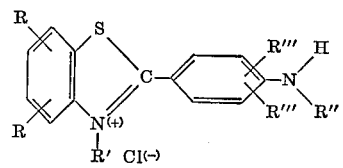

Complexes comprising that benzothiazolium compound which is of the formula

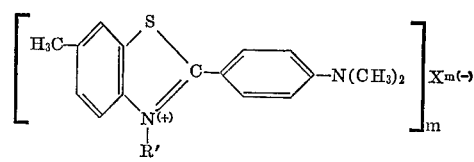

and especially those wherein X represents halide, —HSO₄, —R′SO₄, —H₂PO₄,

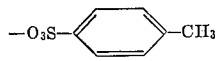

or —O₃SCH₃, constitute a preferred embodiment because of the directness of their synthesis and because of the exceptional performance of methods and compositions containing them in accordance with the present invention. These products are conveniently prepared in yet another known procedure. In this procedure, p-toluidine is heated with sulfur, in the proportion of two moles of p-toluidine to 4 or 5 atoms of sulfur and at elevated temperatures such as, about 200° C. As a result, there is prepared a mixture of products, including a product of the formula

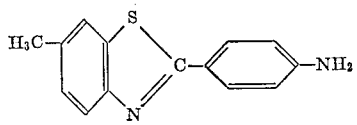

This product is separated from the reaction mixture and from the other products in known procedures and thereafter reacted with a primary loweralkylating agent, and the resulting alkylated benzothiazole product is quaternized according to the procedures hereinabove discussed.

When all R′ and R″ moieties in a given benzothiazolium compound are the same, it is convenient to conduct the primary loweralkylation and the quaternization steps concurrently. In such procedures, a compound of the formula

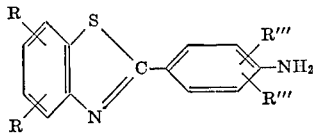

is employed. For example, when all of the R′ and R″ moieties in a given compound represent —CH₃, the above compound is reacted with methanol and hydrochloric or sulfuric acid at temperatures of about 150°–200° C. Preferably, the reaction is conducted under superatmospheric pressure. When sulfuric acid is employed in this method, the yield of product is increased by supplying to the reaction mixture a small catalytic amount of bromide ion, in the form of an alkyl or aralkyl bromide or a soluble inorganic bromide.

The present application is directed to and concerned with the disclosure and claiming of the invention as described hereinbefore. The present application is also directed to the disclosure and claiming of the invention in methods, or compositions comprising or employing any subgeneric group or class of compounds which may be obtained by any permutation or combination of the alternative expressions in the definition of active material to be found hereinbefore.

I claim:

1. A method for the control of a helminth which is a parasite of a host animal body, which comprises contacting said helminth with a helminth controlling amount of an active material which is a complex of (A) a benzothiazolium compound of the formula

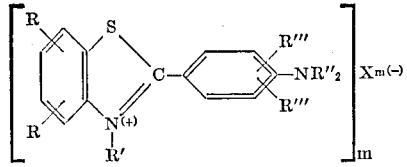

X represents a pharmaceutically acceptable anion; each R independently represents a member selected from the group consisting of hydrogen, loweralkyl, loweralkoxy, bromo and chloro; R′ represents primary loweralkyl; each R″ independently represents a member selected from the group consisting of hydrogen and primary loweralkyl; each R‴ independently represents a member selected from the group consisting of hydrogen, chloro, methoxy, and methyl; and $m$ represents an integer equal to the valence of the anion X; and (B) a metal salt compound of the formula $M_aY_b$ wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of $a$ and $b$ represents an integer such that ($a$ times the valence of M) is equal to ($b$ times the valence of Y).

2. The method of claim 1 wherein the helminth is in its infective phase and the contacting is carried out outside of the host animal body.

3. The method which comprises orally administering to an animal a growth-improving amount of an active material which is a complex of (A) a benzothiazolium compound of the formula

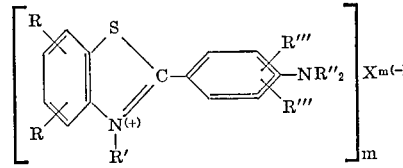

X represents a pharmaceutically acceptable anion; each R independently represents a member selected from the group consisting of hydrogen, loweralkyl, loweralkoxy, bromo and chloro; R′ represents primary loweralkyl; each R″ independently represents a member selected from the group consisting of hydrogen and primary loweralkyl; each R‴ independently represents a member selected from the group consisting of hydrogen, chloro, methoxy, and methyl; and $m$ represents an integer equal to the valence of the anion X; and (B) a metal salts compound of the formula $M_aY_b$ wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of $a$ and $b$ represents an integer such that ($a$ times the valence of M) is equal to ($b$ times the valence of Y).

4. The method of claim 3 wherein the active material is administered in the amount of from 0.01 to 1,000 milligrams per kilogram of animal body weight.

5. The method of claim 3 wherein the complex is 2-(p-dimethylaminophenyl)-3,6-dimethylbenzothiazolium chloride 1:1 complex with zinc chloride.

6. The method of claim 3 wherein the complex is 2-(p-dimethylaminophenyl)-3,6-dimethylbenzothiazolium chloride 2:1 complex with zinc chloride.

7. The method of claim 3 wherein the complex is 2-(p-dimethylaminophenyl)-3,6-dimethylbenzothiazolium chloride 1:1 complex with cuprous chloride.

8. The method of claim 3 wherein the complex is 2-(p-dimethylaminophenyl)-3,6-dimethylbenzothiazolium chloride 2:1 complex with ferrous chloride.

9. The method which comprises orally administering to an animal a composition comprising an active ingredient in intimate admixture with an innocuous ingestible adjuvant, the composition being administered in an amount sufficient to provide a growth improving amount of the active ingredient, and the active ingredient being a complex of (A) a benzothiazolium compound of the formula

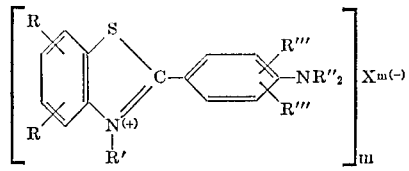

X represents a pharmaceutically acceptable anion; each R independently represents a member selected from the group consisting of hydrogen, loweralkyl, loweralkoxy, bromo and chloro; R' represents primary loweralkyl; each R" independently represents a member selected from the group consisting of hydrogen and primary loweralkyl; each R''' independently represents a member selected from the group consisting of hydrogen, chloro, methoxy, and methyl; and m represents an integer equal to the valence of the anion X; and (B) a metal salt compound of the formula $M_aY_b$ wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of a and b represents an integer such that (a times the valence of M) is equal to (b times the valence of Y).

10. The method of claim 9 wherein the composition is administered in an amount sufficient to provide a dosage of from 0.01 to 1,000 milligrams of active ingredient per kilogram of animal body weight.

11. The method of claim 9 wherein the complex is 2-(p-dimethylaminophenyl) - 3,6-dimethylbenzothiazolium chloride 1:1 complex with zinc chloride.

12. The method of claim 9 wherein the complex is 2-(p-dimethylaminophenyl) - 3,6-dimethylbenzothiazolium chloride 2:1 complex with zinc chloride.

13. The method of claim 9 wherein the complex is 2-(p-dimethylaminophenyl) - 3,6-dimethylbenzothiazolium chloride 1:1 complex with cuprous chloride.

14. The method of claim 9 wherein the complex is 2-(p-dimethylaminophenyl) - 3,6-dimethylbenzothiazolium chloride 2:1 complex with ferrous chloride.

15. A composition for controlling helminths and improving growth in animals comprising from 0.5 to 98 percent by weight of an active ingredient in intimate admixture with a finely divided solid, which is non-reactive to the active ingredient, the active ingredient being a complex of (A) a benzothiazolium compound of the formula

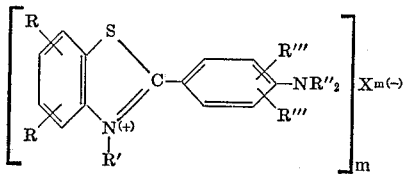

X represents a pharmaceutically acceptable anion; each R independently represents a member selected from the group consisting of hydrogen, loweralkyl, loweralkoxy, bromo and chloro; R' represents primary loweralkyl; each R" independently represents a member selected from the group consisting of hydrogen and primary loweralkyl; each R''' independently represents a member selected from the group consisting of hydrogen, chloro, methoxy, and methyl; and m represents an integer equal to the valence of the anion X; and (B) a metal salt compound of the formula $M_aY_b$ wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of a and b represents an integer such that (a times the valence of M) is equal to (b times the valence of Y).

16. The composition of claim 15 wherein the finely divided solid is an edible finely divided solid.

17. The composition of claim 16 wherein the complex is 2-(p-dimethylaminophenyl) - 3,6-dimethylbenzothiazolium chloride 1:1 complex with zinc chloride.

18. The composition of claim 16 wherein the complex is 2-(p-dimethylaminophenyl) - 3,6-dimethylbenzothiazolium chloride 2:1 complex with zinc chloride.

19. The composition of claim 16 wherein the complex is 2-(p-dimethylaminophenyl) - 3,6-dimethylbenzothiazolium chloride 1:1 complex with cuprous chloride.

20. The composition of claim 16 wherein the complex is 2-(p-dimethylaminophenyl) - 3,6-dimethylbenzothiazolium chloride 2:1 complex with ferrous chloride.

21. An animal feed composition comprising at least 0.0001 percent by weight of a complex of (A) a benzothiazolium compound of the formula

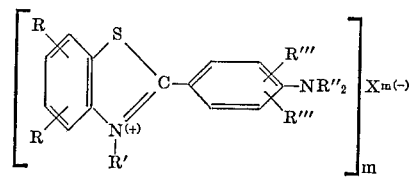

X represents a pharmaceutically acceptable anion; each R independently represents a member selected from the group consisting of hydrogen, loweralkyl, loweralkoxy, bromo and chloro; R' represents primary loweralkyl; each R" independently represents a member selected from the group consisting of hydrogen and primary loweralkyl; each R''' independently represents a member selected from the group consisting of hydrogen, chloro, methoxy, and methyl; and m represents an integer equal to the valence of the anion X; and (B) a metal salt compound of the formula $M_aY_b$ wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of a and b represents an integer such that (a times the valence of M) is equal to (b times the valence of Y) and an animal feed.

22. The composition of claim 21 wherein the complex is 2-(p-dimethylaminophenyl) - 3,6-dimethylbenzothiazolium chloride 1:1 complex with zinc chloride.

23. The composition of claim 21 wherein the complex is 2-(p-dimethylaminophenyl) - 3,6-dimethylbenzothiazolium chloride 2:1 complex with zinc chloride.

24. The composition of claim 21 wherein the complex is 2-(p-dimethylaminophenyl) - 3,6-dimethylbenzothiazolium chloride 1:1 complex with cuprous chloride.

25. The composition of claim 21 wherein the complex is 2-(p-dimethylaminophenyl) - 3,6-dimethylbenzothiazolium chloride 2:1 complex with ferrous chloride.

26. A composition for controlling helminths and improving growth in animals comprising from 5 to 98 percent of an active material in admixture with a dispersing agent, said active material being a complex of (A) a benzothiazolium compound of the formula

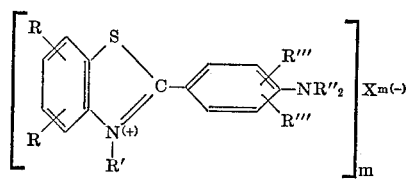

X represents a pharmaceutically acceptable anion; each R independently represents a member selected from the group consisting of hydrogen, loweralkyl, loweralkoxy, bromo and chloro; R' represents primary loweralkyl; each R" independently represents a member selected from the group consisting of hydrogen and primary loweralkyl; each R''' independently represents a member selected from the group consisting of hydrogen, chloro, methoxy, and methyl; and m represents an integer equal to the valence of the anion X; and (B) a metal salt compound of the formula $M_aY_b$ wherein M represents a member selected from the group consisting of copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$, and cadmium$^{(++)}$; Y represents a pharmaceutically acceptable anion; and each of $a$ and $b$ represents an integer such that ($a$ times the valence of M) is equal to ($b$ times the valence of Y).

References Cited

UNITED STATES PATENTS 3,336,329   8/1967   Reifschneider _____ 260—299

ALBERT T. MEYERS, *Primary Examiner.*

R. BARRESE, *Assistant Examiner.*